(12) United States Patent
Lee et al.

(10) Patent No.: US 10,402,949 B2
(45) Date of Patent: Sep. 3, 2019

(54) METHOD, DEVICE, AND RECORDING MEDIUM FOR PROCESSING IMAGE

(71) Applicant: Samsung Electronics Co., Ltd., Suwon-si, Gyeonggi-do (KR)

(72) Inventors: Jin-bong Lee, Seoul (KR); Do-wan Kim, Suwon-si (KR); Jae-yun Jeong, Suwon-si (KR); Yong-gyoo Kim, Seoul (KR); Jae-kyeong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 15/728,864

(22) Filed: Oct. 10, 2017

(65) Prior Publication Data

US 2018/0101938 A1 Apr. 12, 2018

(30) Foreign Application Priority Data

Oct. 11, 2016 (KR) ........................ 10-2016-0131388

(51) Int. Cl.
*G09G 5/00* (2006.01)
*G06T 5/00* (2006.01)
*G06T 5/50* (2006.01)
*G06T 7/536* (2017.01)

(52) U.S. Cl.
CPC .............. *G06T 5/006* (2013.01); *G06T 5/005* (2013.01); *G06T 5/50* (2013.01); *G06T 7/536* (2017.01); *G06T 2207/10024* (2013.01); *G06T 2207/20221* (2013.01)

(58) Field of Classification Search
CPC ........ G06T 5/006; G06T 7/536; G06T 5/005; G06T 5/50; G06T 2207/10024; G06T 2207/20221

USPC .................................................. 345/589, 619
See application file for complete search history.

(56) References Cited

U.S. PATENT DOCUMENTS

| 8,446,433 | B1 | 5/2013 | Mallet et al. |
| 10,110,872 | B2 * | 10/2018 | Vienne ................. H04N 13/128 |
| 2002/0015052 | A1 * | 2/2002 | Deering ................ G06T 3/0081 |
| | | | 345/647 |
| 2003/0160790 | A1 | 8/2003 | Tang et al. |
| 2005/0052620 | A1 | 3/2005 | Tamura |
| 2007/0188633 | A1 | 8/2007 | Mandy et al. |
| 2013/0315558 | A1 * | 11/2013 | Nakamura ............... H04N 9/87 |
| | | | 386/230 |
| 2015/0379697 | A1 | 12/2015 | Pohl |
| 2016/0314564 | A1 * | 10/2016 | Jones ...................... G06T 15/04 |

FOREIGN PATENT DOCUMENTS

WO 01/095608 A2 12/2001

* cited by examiner

*Primary Examiner* — Sarah Lhymn
(74) *Attorney, Agent, or Firm* — Jefferson IP Law, LLP

(57) ABSTRACT

A method of processing an image in a device, and the device thereof are provided. The method includes determining a distortion correction ratio of each of a plurality of vertices included in a source image, based on information about a lens through which the source image is projected, determining corrected location information of pixels located between the plurality of vertices, based on the distortion correction ratio of each of the plurality of vertices and interpolation ratios of the pixels, and rendering a distortion-corrected image including pixels determined as a result of performing interpolation on the plurality of vertices based on the corrected location information.

19 Claims, 12 Drawing Sheets

METHOD, DEVICE, AND RECORDING MEDIUM FOR PROCESSING IMAGE

CROSS-REFERENCE TO RELATED APPLICATION(S)

This application claims the benefit under 35 U.S.C. § 119(a) of a Korean patent application filed on Oct. 11, 2016 in the Korean Intellectual Property Office and assigned Serial number 10-2016-0131388, the entire disclosure of which is hereby incorporated by reference.

TECHNICAL FIELD

The present disclosure relates to methods of processing an image, devices for processing an image, and recording media having recorded thereon programs for executing the methods.

BACKGROUND

Various technologies for displaying images capable of allowing users to experience a virtual reality (VR) are currently developed. The VR experience technologies may be implemented using a device such as a head-mounted display (HMD) to allow a user to experience VR by, for example, distorting an image output through a lens, based on a view of the user.

When an image output from a VR providing device is projected through a lens, distortion may occur in a VR image viewed by a user. The distortion may increase fatigue of the user and thus reduce immersion in the VR experience. As such, research is being conducted into various image processing techniques for offsetting distortion due to a lens. However, VR images corrected using the typical image processing techniques have low image quality.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods, devices, and recording media for processing an image to increase image quality by generating pixels corrected based on distortion correction ratios and information about vertices included in the image, and rendering a distortion-corrected image capable of offsetting distortion due to a lens through which the image is projected.

In accordance with an aspect of the present disclosure, a method of processing an image in a device is provided. The method includes determining a distortion correction ratio of each of a plurality of vertices included in a source image, based on information about a lens through which the source image is projected, determining corrected location information of pixels located between the plurality of vertices, based on the distortion correction ratio of each of the plurality of vertices and interpolation ratios of the pixels, and rendering a distortion-corrected image including pixels determined as a result of performing interpolation on the plurality of vertices based on the corrected location information.

The corrected location information of the pixels may include distortion correction ratios of the pixels, which are calculated as a result of performing interpolation on the distortion correction ratio of each of the plurality of vertices based on the interpolation ratios of the pixels.

The method may further include determining distances of the pixels from a center of the source image based on distances between the center of the source image and the plurality of vertices and the interpolation ratios of the pixels, and the rendering of the distortion-corrected image may include determining changed distances of the pixels based on the distances of the pixels from the center of the source image and distortion correction ratios of the pixels.

The method may further include determining depth values of the plurality of vertices based on the distortion correction ratio of each of the plurality of vertices and a distance between a point of view and a display on which the source image is projected, and the corrected location information of the pixels may include depth values of the pixels, which are calculated as a result of performing interpolation on the depth values of the plurality of vertices based on the interpolation ratios of the pixels.

The rendering of the distortion-corrected image may include rendering a distortion-corrected image including a plurality of vertices and pixels corrected based on the determined depth values.

The determining of the distortion correction ratio of each of the plurality of vertices may include determining color-specific distortion correction ratios of the plurality of vertices, and the corrected location information of the pixels may include color-specific distortion correction ratios of the pixels, which are calculated as a result of performing interpolation on the color-specific distortion correction ratios of the plurality of vertices based on the interpolation ratios.

The rendering of the distortion-corrected image may include generating color-specific distortion-corrected images including pixels generated as a result of performing interpolation on the plurality of vertices based on the color-specific distortion correction ratios of the pixels, and rendering a distortion-corrected image by combining the color-specific distortion-corrected images.

The method may further include determining color-specific depth values of the plurality of vertices based on the color-specific distortion correction ratios of the plurality of vertices and a distance between a point of view and a display on which the source image is projected, and the corrected location information of the pixels may include color-specific depth values of the pixels, which are calculated as a result of performing interpolation on the color-specific depth values of the plurality of vertices based on the interpolation ratios.

The method may further include outputting the distortion-corrected image, and the distortion-corrected image may be viewed through the lens by a user of the device.

In accordance with another aspect of the present disclosure, a device for processing an image is provided. The device includes at least one processor configured to determine a distortion correction ratio of each of a plurality of vertices included in a source image, based on information about a lens through which the source image is projected, determine corrected location information of pixels located between the plurality of vertices, based on the distortion correction ratio of each of the plurality of vertices and interpolation ratios of the pixels, and render a distortion-corrected image including pixels determined as a result of performing interpolation on the plurality of vertices based on the corrected location information, and a projector configured to output the distortion-corrected image.

The corrected location information of the pixels may include distortion correction ratios of the pixels, which are calculated as a result of performing interpolation on the distortion correction ratio of each of the plurality of vertices based on the interpolation ratios of the pixels.

The at least one processor may further be configured to determine distances of the pixels from a center of the source image based on distances between the center of the source image and the plurality of vertices and the interpolation ratios of the pixels, and determine changed distances of the pixels based on the distances of the pixels from the center of the source image and distortion correction ratios of the pixels.

The at least one processor may further be configured to determine depth values of the plurality of vertices based on the distortion correction ratio of each of the plurality of vertices and a distance between a point of view and a display on which the source image is projected, and the corrected location information of the pixels may include depth values of the pixels, which are calculated as a result of performing interpolation on the depth values of the plurality of vertices based on the interpolation ratios of the pixels.

The at least one processor may further be configured to render a distortion-corrected image including a plurality of vertices and pixels corrected based on the determined depth values.

The at least one processor may further be configured to determine color-specific distortion correction ratios of the plurality of vertices, and the corrected location information of the pixels may include color-specific distortion correction ratios of the pixels, which are calculated as a result of performing interpolation on the color-specific distortion correction ratios of the plurality of vertices based on the interpolation ratios.

The at least one processor may further be configured to generate color-specific distortion-corrected images including pixels generated as a result of performing interpolation on the plurality of vertices based on the color-specific distortion correction ratios of the pixels, and render a distortion-corrected image by combining the color-specific distortion-corrected images.

The at least one processor may further be configured to determine color-specific depth values of the plurality of vertices based on the color-specific distortion correction ratios of the plurality of vertices and a distance between a point of view and a display on which the source image is projected, and the corrected location information of the pixels may include color-specific depth values of the pixels, which are calculated as a result of performing interpolation on the color-specific depth values of the plurality of vertices based on the interpolation ratios.

The lens of the device may have a preset angle of view, and the distortion-corrected image may be viewed through the lens by a user of the device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
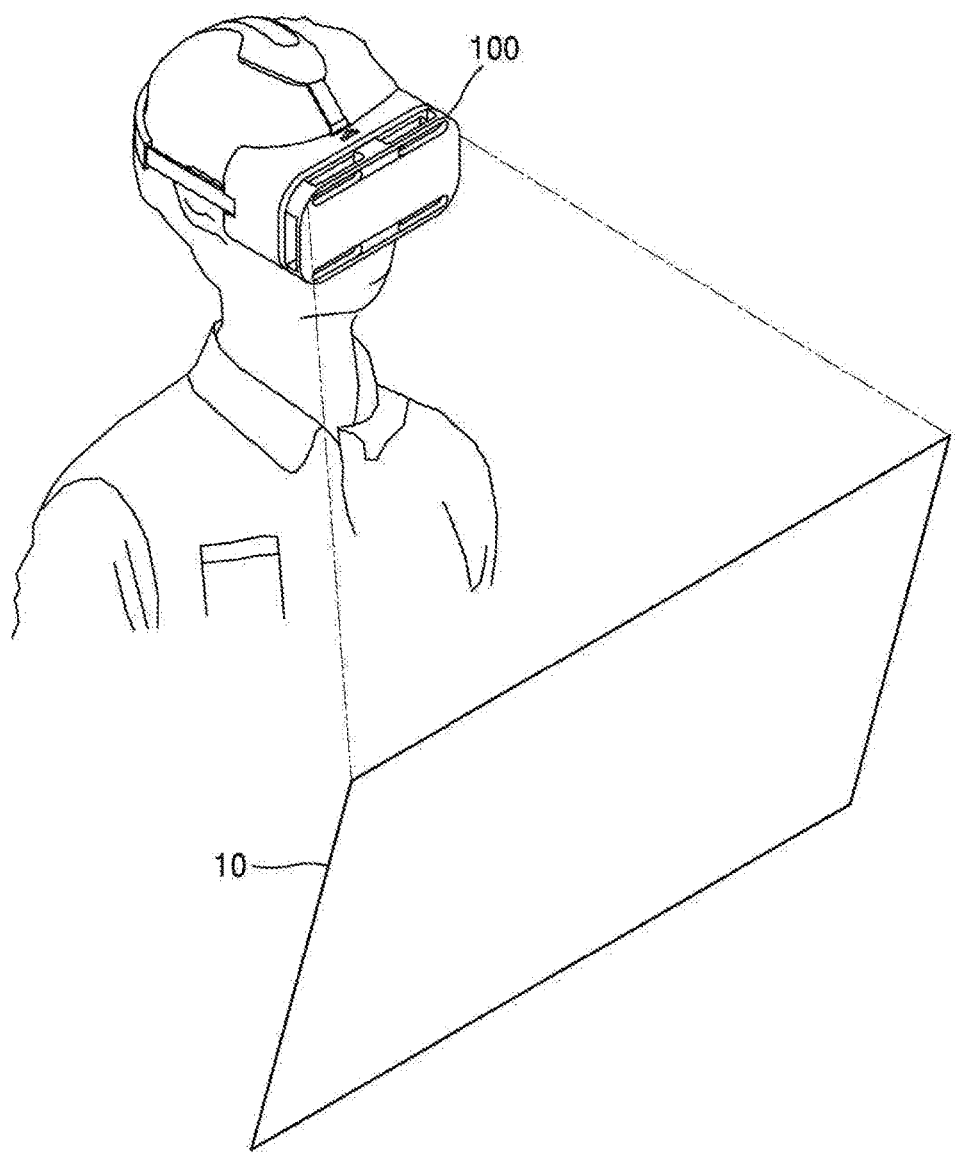
FIG. 1 is a conceptual diagram for describing a method, performed by a device, of processing an image according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although most terms used in this specification are selected among currently popular general terms in consideration of functions implemented in the present disclosure, some terms are used based on the intentions of those of ordinary skill in the art, precedents, emergence of new technologies, or the like. Specific terms may be arbitrarily selected by the applicant and, in this case, the meanings thereof will be described in the detailed description of the disclosure. Thus, the terms used herein should be defined based on practical meanings thereof and the whole content of this specification, rather than based on names of the terms.

It will be understood that the terms "comprises", "comprising", "includes" and/or "including", when used herein, specify the presence of stated elements, but do not preclude the presence or addition of one or more other elements. The suffix such as " . . . er", "unit", or "module" is used to denote an entity for performing at least one function or operation, and may be embodied in the form of hardware, software, or a combination thereof.

Reference will now be made in detail to various embodiments, examples of which are illustrated in the accompanying drawings, wherein like reference numerals refer to like elements throughout, and in the following description, for a more clear description of the present disclosure, parts or units that are not related to the descriptions are omitted. In this regard, the present embodiments may have different forms and should not be construed as being limited to the descriptions set forth herein. Accordingly, the various embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

FIG. 1 is a conceptual diagram for describing a method, performed by a device 100, of processing an image according to an embodiment of the present disclosure.

Referring to FIG. 1, the device 100 according to an embodiment may output an image for providing a virtual reality (VR) environment to a user. The image output from the device 100 may be projected through a lens (not shown) having a preset angle of view. Herein, the lens having the preset angle of view may be included in or provided outside the device 100.

The user who is wearing the device 100 may view the image output from the device 100, through the lens having the preset angle of view and may feel as if the image is output to a distance far from the user. As such, the device 100 may provide the user with a virtual environment, in which the user feels as if he or she is in a virtual reality shown by the image. In this specification, for convenience of explanation, differently from the image actually output from the device 100, an image perceived by the user through the lens having the preset angle of view is referred to as a virtual reality (VR) image 10. For example, referring to FIG. 1, the user may view the VR image 10 by perceiving the image output from the device 100, through the lens having the preset angle of view.

When the image output from the device 100 is projected through the lens, distortion may occur in the VR image 10. For example, when the image output from the device 100 is projected through a telephoto lens, pincushion distortion may occur in the VR image 10.

To prevent distortion of the VR image 10 due to the angle of view of the lens, the device 100 according to an embodiment may generate a distortion-corrected image capable of offsetting distortion occurring due to the lens. In the following description, for convenience of explanation, an image on which distortion correction is not performed is referred to as a source image, and an image on which distortion correction is performed is referred to as a distortion-corrected image.

The device 100 according to an embodiment may determine a distortion correction ratio of each of a plurality of vertices included in the source image, based on information about the lens having the preset angle of view. In addition, the device 100 may determine corrected location information of pixels located between the plurality of vertices, based on the distortion correction ratio of each of the plurality of vertices and interpolation ratios of the pixels. Herein, it is assumed that the device 100 determines values, locations, or the like of the pixels by performing interpolation on the plurality of vertices without processing data of the pixels to reduce complexity. The corrected location information of the pixels may include at least one of distortion correction ratios of the pixels and depth values of the pixels.

For example, the device 100 may calculate the distortion correction ratios of the pixels as a result of performing interpolation on the distortion correction ratio of each of the plurality of vertices based on the interpolation ratios of the pixels. When an interpolation ratio of a pixel located between first and second vertices is preset to be $t:1-t$, the device 100 may calculate a distortion correction ratio of the pixel by performing interpolation on $\lambda_1$ and $\lambda_2$ corresponding to the distortion correction ratio of the first vertex, based on the ratio of $t:1-t$.

As another example, the device 100 may calculate the depth values of the pixels by performing interpolation on a depth value calculated based on the distortion correction ratio of each of the plurality of vertices, based on the interpolation ratios of the pixels. The device 100 may project a three-dimensional (3D) image rendered based on the depth values of the plurality of vertices and the depth values of the pixels, through the lens. In this case, pincushion distortion of the VR image 10 perceived by the user based on perspective projection may be corrected. A detailed description thereof will be provided below with reference to FIG. 9.

The device 100 according to an embodiment may have various forms. For example, in this specification, the device 100 may be configured as a mobile phone, smartphone, laptop computer, tablet PC, electronic book device, digital broadcasting receiver, personal digital assistant (PDA), portable multimedia player (PMP), navigation system, smart TV, smart car, consumer electronics (CE) device (e.g., a refrigerator or air conditioner having a display panel), head-mounted display (HMD), or the like, but is not limited thereto.

Figure 2:
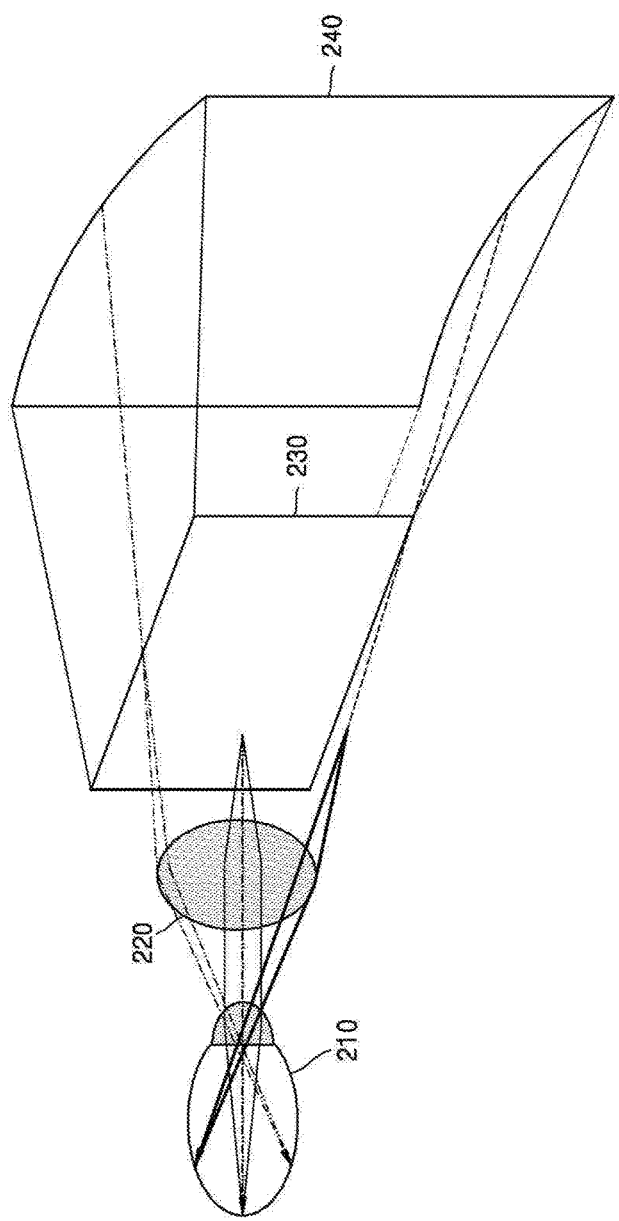
FIG. 2 is a diagram for describing pincushion distortion occurring when an image is perceived through a lens according to an embodiment of the present disclosure.

FIG. 2 is a diagram for describing pincushion distortion occurring when an image 230 is perceived through a lens 220 according to an embodiment of the present disclosure.

Referring to FIG. 2, when an eye 210 of a user perceives the image 230 output from a device, through the lens 220, a VR image 240 in which distortion occurs due to an angle of view of the lens 220 may be perceived. Herein, it is assumed that the lens 220 is a telephoto lens. As illustrated in FIG. 2, when the image 230 is perceived through a telephoto lens, the VR image 240, in which pincushion distortion occurs causing a concaved center part, may be perceived.

Figure 3:
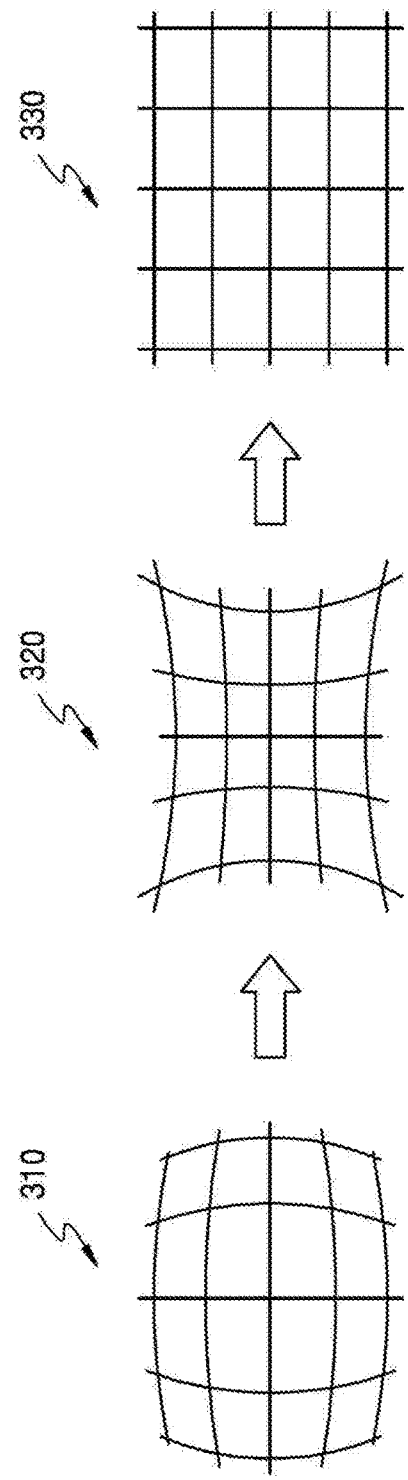
FIG. 3 is a diagram for describing a method of applying barrel distortion to correct an image having pincushion distortion according to an embodiment of the present disclosure.

FIG. 3 is a diagram for describing a method of applying barrel distortion to correct an image having pincushion distortion according to an embodiment of the present disclosure.

Referring to FIG. 3, when a distortion-corrected image 310 is generated by applying barrel distortion to a source image, pincushion distortion 320 occurring when the distortion-corrected image 310 is perceived through a lens may be offset and thus a VR image 330, from which distortion is removed, may be obtained.

A device according to an embodiment may generate an image, to which barrel distortion is applied, by correcting locations of pixels based on distortion correction ratios of vertices of a source image, which are determined based on information about distortion due to a lens. Particularly, the device may render a distortion-corrected image capable of effectively offsetting pincushion distortion, by determining locations of neighboring pixels by performing interpolation on a plurality of vertices according to distortion correction ratios of the pixels based on distortion correction ratios of the vertices. A method of rendering the distortion-corrected image by the device according to an embodiment will be described in detail below with reference to FIG. 5.

Figure 4:
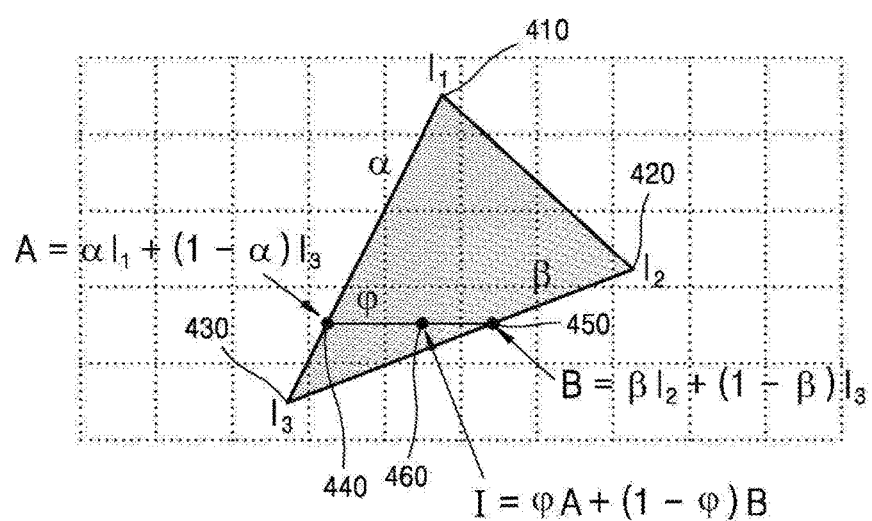
FIG. 4 is a diagram for describing a method of determining locations of pixels by performing linear interpolation on vertices according to an embodiment of the present disclosure.

FIG. 4 is a diagram for describing a method of determining locations of pixels by performing linear interpolation on vertices according to an embodiment of the present disclosure.

Referring to FIG. 4, as a method of linearly interpolating points located at ratios of $\alpha$, $\beta$, and $\varphi$ from vertices $I_1$ 410, $I_2$ 420, and $I_3$ 430, a device may determine a pixel A 440 by performing interpolation on the vertices $I_1$ 410 and $I_3$ 430 at a ratio of $\alpha:1-\alpha$. Furthermore, the device may determine a pixel B 450 by performing interpolation on the vertices $I_1$ 410 and $I_2$ 420 at a ratio of $\beta:1-\beta$. In addition, the device may determine a pixel I 460 by performing interpolation on the pixel A 440 and the pixel B 450 at a ratio of $\varphi:1-\varphi$.

Figure 5:
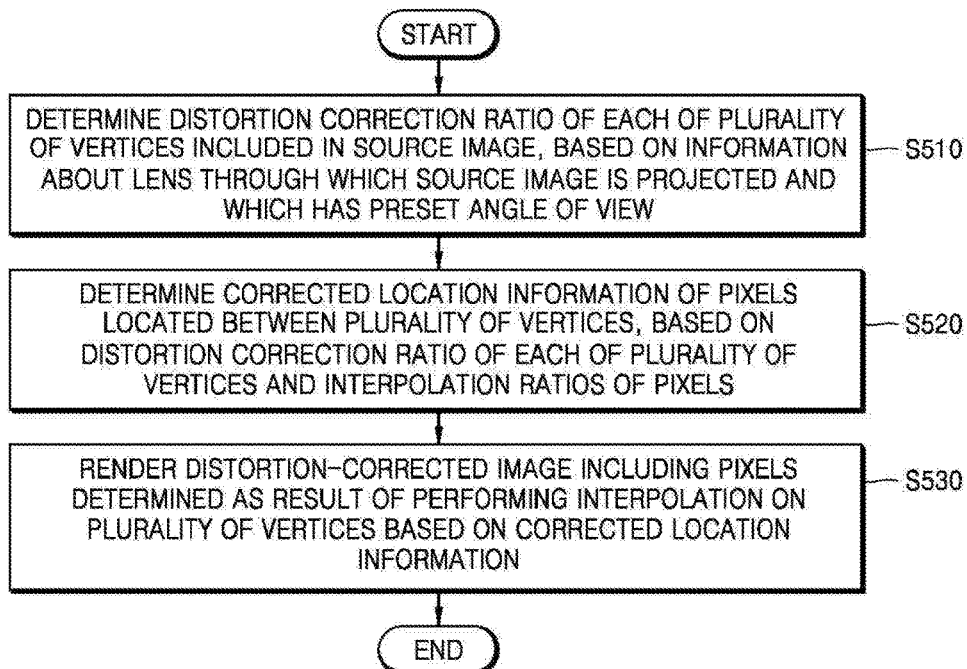
FIG. 5 is a flowchart of a method, performed by a device, of processing an image according to an embodiment of the present disclosure.

FIG. 5 is a flowchart of a method, performed by a device, of processing an image according to an embodiment of the present disclosure.

Referring to FIG. 5, in operation S510, the device determines a distortion correction ratio of each of a plurality of vertices included in a source image, based on information about a lens through which the source image is projected and which has a preset angle of view. The distortion correction ratio of each of the plurality of vertices may be determined as shown in Equation 1.

$$r' = \lambda \times r = (1 + K_0 r^2 + K_1 r^4 + K_2 r^6 + \ldots)r \quad \text{Equation 1}$$

In Equation 1, r denotes a distance from a center of the source image to a vertex, $K_0$, $K_1$, and $K_2$ are parameters determined based on the angle of view of the lens, r' denotes a changed distance from the center of the source image to the vertex to correct pincushion distortion, and $\lambda$ denotes a distortion correction ratio of the vertex.

The distance from the center of the source image to the vertex, i.e., r, is calculated as a distance from a center coordinate $(x_o, y_o)$ of the image to a coordinate $(x, y)$ of the vertex, and may be determined as shown in Equation 2.

$$r(x,y) = \sqrt{(x-x_o)^2 + (y-y_o)^2} \quad \text{Equation 2}$$

In operation S520, the device determines corrected location information of pixels located between the plurality of vertices, based on the distortion correction ratio of each of the plurality of vertices and interpolation ratios of the pixels. Herein, the corrected location information of the pixels may include at least one of distortion correction ratios of the pixels and depth values of the pixels.

For example, when the device determines the distortion correction ratios of the pixels, the device may determine distances between the pixels and the center of the source image by performing interpolation on distances between the plurality of vertices and the source image. The device may determine a distance $r_t$ of a pixel provided at a location where first and second vertices included in the plurality of vertices have a ratio of (t:1−t), from the center of the image, based on Equation 3.

$$r_t = r_1 + t(r_2 - r_1) \quad \text{Equation 3}$$

In Equation 3, $r_1$ and $r_2$ denote a distance between the first vertex and the center of the source image, and a distance between the second vertex and the center of the source image, respectively.

The device may determine the distortion correction ratios of the pixels by performing interpolation on the distortion correction ratio of the vertex, which is calculated based on Equation 1, based on the interpolation ratios of the pixels. The distortion correction ratios of the pixels may be determined based on Equation 4. A distortion correction ratio $\lambda_t$ to be applied to a pixel to be linearly interpolated from the vertices may be obtained using a linear interpolation ratio (t:1−t) of the pixel.

$$\lambda_t \approx \lambda_1 + t(\lambda_2 - \lambda_1) \quad \text{Equation 4}$$

In Equation 4, $\lambda_1$ and $\lambda_2$ denote distortion correction ratios of the first and second vertices, respectively, and $\lambda_t$ denotes a distortion correction ratio of a pixel located between the first and second vertices. The device may correct a distance between the pixel and the center of the source image by applying the calculated distortion correction ratio of the pixel to the distance between the pixel and the center of the source image. The corrected distance between the pixel and the center of the source image may be expressed as shown in Equation 5.

$$r_t' = \lambda_t r_t = (\lambda_1 + t(\lambda_2 - \lambda_1)) r_t \quad \text{Equation 5}$$

In Equation 5, $r_t'$ denotes a distance between the pixel and the center of the source image, which is corrected by the device.

A coordinate of the pixel in two dimensions may be obtained as shown in Equation 6.

$$x_t = r_t \cos\theta, y_t = r_t \sin\theta \quad \text{Equation 6}$$

In Equation 6, $\theta$ denotes an angle between the pixel and the center of the source image, $r_t$ denotes a distance between the pixel and the center of the source image, and $x_t$ and $y_t$ denote x-axis and y-axis coordinates of the pixel.

The corrected location of the pixel, which is calculated based on Equations 5 and 6, may be determined as shown in Equation 7.

$$x_t'(\lambda_1 + t(\lambda_2 - \lambda_1)) x_t$$

$$y_t'(\lambda_1 + t(\lambda_2 - \lambda_1)) y_t \quad \text{Equation 7}$$

In Equation 7, $x_t'$ and $y_t'$ denote corrected x-axis and y-axis coordinates of the pixel.

As another example, to render a distortion-corrected image, the device may calculate the depth values of the pixels by performing interpolation on a depth value calculated based on the distortion correction ratio of each of the plurality of vertices, based on the interpolation ratios of the pixels. The device may offset pincushion distortion by changing the depth values of the plurality of vertices and the pixels. A detailed description thereof will be provided below with reference to FIG. 9.

In operation 530, the device renders a distortion-corrected image including pixels determined as a result of performing interpolation on the plurality of vertices based on the corrected location information.

The device according to an embodiment may correct locations of the plurality of vertices and the pixels based on the calculated distortion correction ratios. According to another embodiment, the device may generate a 3D distortion-corrected image including a plurality of vertices and pixels which are corrected based on the calculated depth values.

The device according to an embodiment may provide a VR image, from which pincushion distortion is removed, to a user by projecting the distortion-corrected image through the lens having the preset angle of view.

Figure 6:
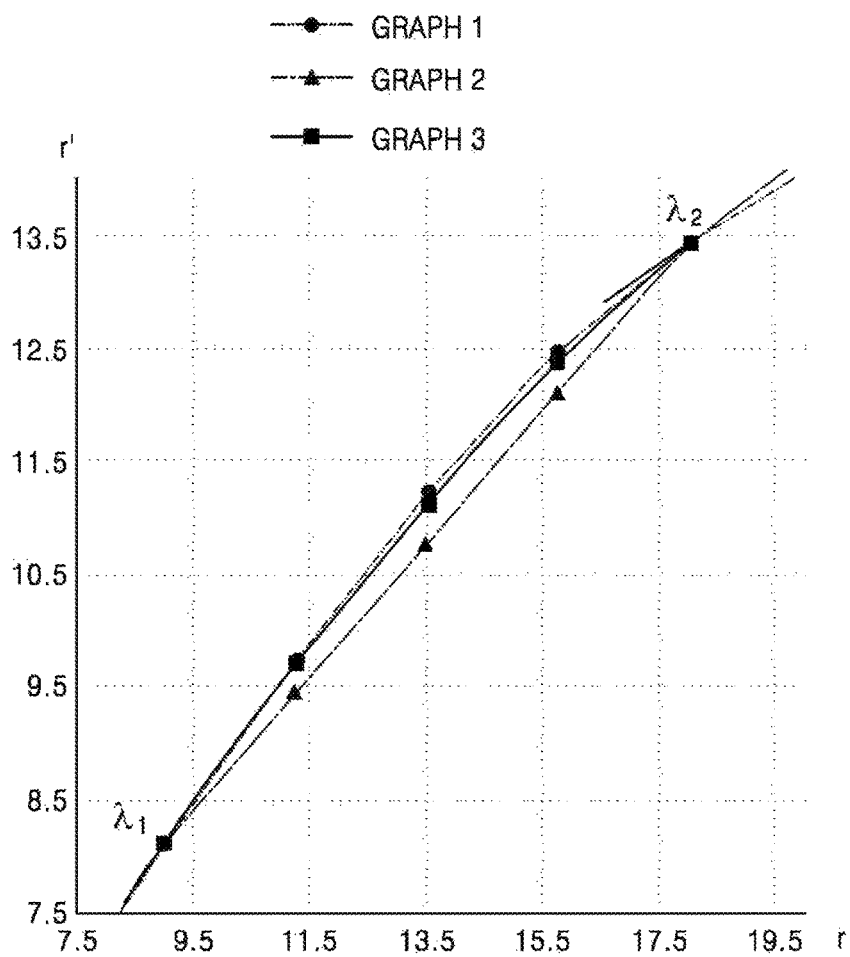
FIG. 6 is a graph for describing accuracy of a distortion-corrected image rendered by a device according to an embodiment of the present disclosure.

FIG. 6 is a graph for describing accuracy of a distortion-corrected image rendered by a device according to an embodiment of the present disclosure.

Referring to FIG. 6, accuracies of graph 1 showing a typical pixel-based distortion correction result, graph 2 showing a distortion correction result according to an embodiment, and graph 3 showing a typical linear-interpolation-based distortion correction result may be compared. Herein, the pixel-based distortion correction result indicates a method of correcting all pixels based on Equation 1. The pixel-based distortion correction has high complexity.

The distance between the pixel and the center of the source image, which is corrected according to the linear-interpolation-based distortion correction technology, may be expressed as shown in Equation 8.

$$r_t'' = r_1'' + t(t_2'' - r_1'') \qquad \text{Equation 8}$$

In Equation 8, $r_1''$ and $r_2''$ denote distances between vertices and the center of the source image, which are corrected according to the linear-interpolation-based distortion correction technology, and $r_t''$ denotes a distance between the pixel and the center of the source image, which is corrected according to the linear-interpolation-based distortion correction technology. If Equation 8 is expanded using Equation 3, Equation 9 may be obtained.

$$r_t'' = \frac{\lambda_2 r_2 - \lambda_1 r_1}{r_2 - r_1} r_t + \frac{(\lambda_1 - \lambda_2) r_1 r_2}{r_2 - r_1} \qquad \text{Equation 9}$$

The distance between the pixel, which is distortion-corrected according to an embodiment, and the center of the source image may be expressed based on Equation 10 as a result of expansion using Equations 3 and 5.

$$r_t' = \frac{\lambda_2 - \lambda_1}{r_2 - r_1} r_t^2 + \frac{\lambda_1 r_2 - \lambda_2 r_1}{r_2 - r_1} r_t \qquad \text{Equation 10}$$

When errors of the linear-interpolation-based distortion correction technology and the distortion correction technology according to an embodiment are denoted by $e_f$ and $e_g$, respectively, the difference between the errors may be determined based on Equation 11.

$$e_f - e_g = r_{t_{ideal}}' - \left(\frac{\lambda_2 r_2 - \lambda_1 r_1}{r_2 - r_1} r_t + \frac{(\lambda_1 - \lambda_2) r_1 r_2}{r_2 - r_1}\right) - \qquad \text{Equation 11}$$

-continued $$\left(r_{t_{ideal}}' - \left(\frac{\lambda_2 - \lambda_1}{r_2 - r_1} r_t^2 + \frac{\lambda_1 r_2 - \lambda_2 r_1}{r_2 - r_1} r_t\right)\right) =$$

$$\left(\frac{\lambda_2 - \lambda_1}{r_2 - r_1}\right)(r_t - r_1)(r_t - r_2) >$$

$$0 ( \because \lambda_2 < \lambda_1, r_t < r_2, r_t > r_1 ) \therefore e_f > e_g$$

In Equation 11, $r_{t\ ideal}'$ denotes a distance between the pixel and the center of the source image, which is corrected according to the pixel-based distortion correction technology. In the current embodiment, it is assumed that $r_{t\ ideal}'$ is an ideal value, and performances of the linear-interpolation-based distortion correction technology and the distortion correction technology according to an embodiment are compared.

In Equation 11, since the error $e_g$ of distortion correction technology according to an embodiment is smaller than the error $e_f$ of the linear-interpolation-based distortion correction technology, it is shown that the distortion correction technology according to an embodiment has high accuracy.

Figure 7:
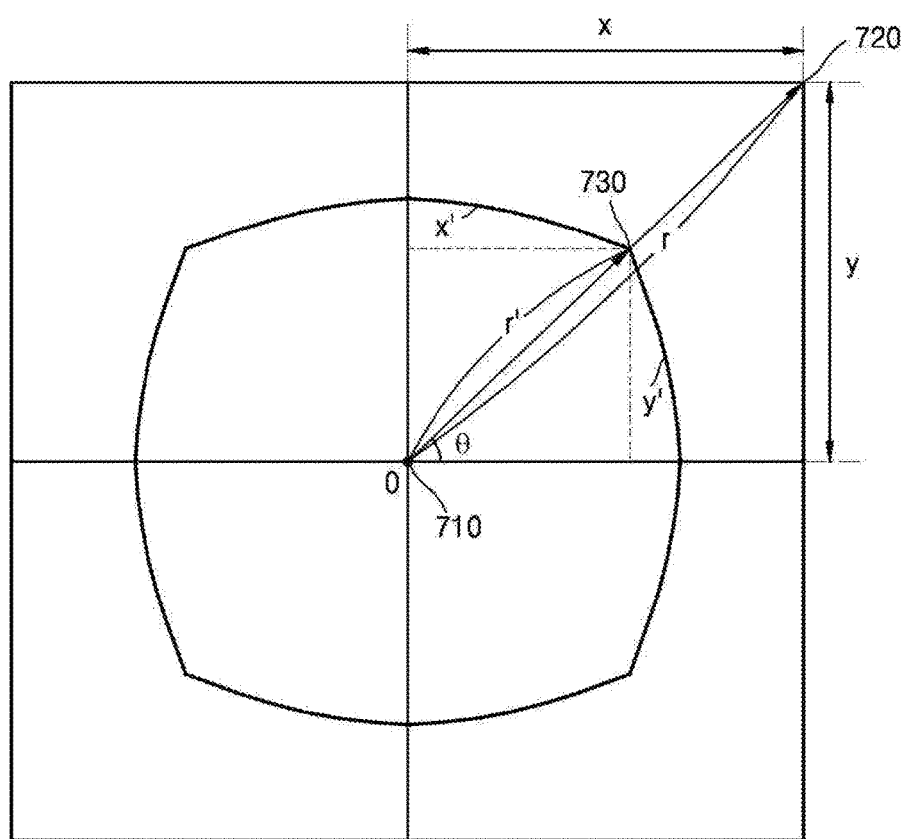
FIG. 7 is a diagram for describing changes in locations of pixels in two dimensions based on correction of lens distortion, and changes in an image based on the changes in the locations of the pixels according to an embodiment of the present disclosure.

FIG. 7 is a diagram for describing changes in locations of pixels in two dimensions based on correction of lens distortion, and changes in an image based on the changes in the locations of the pixels according to an embodiment of the present disclosure.

Referring to FIG. 7, when a coordinate (x, y) 720 is distortion-corrected to a coordinate (x', y') 730, if similarity between a triangle composed of sides r', x', and y' and a triangle composed of sides r, x, and y is used, it is shown that a distortion correction ratio of x and y equals a distortion correction ratio of a distance r from a center of the image. Herein, each of the coordinates 720 and 730 may be determined based on an origin O 710.

Figure 8:
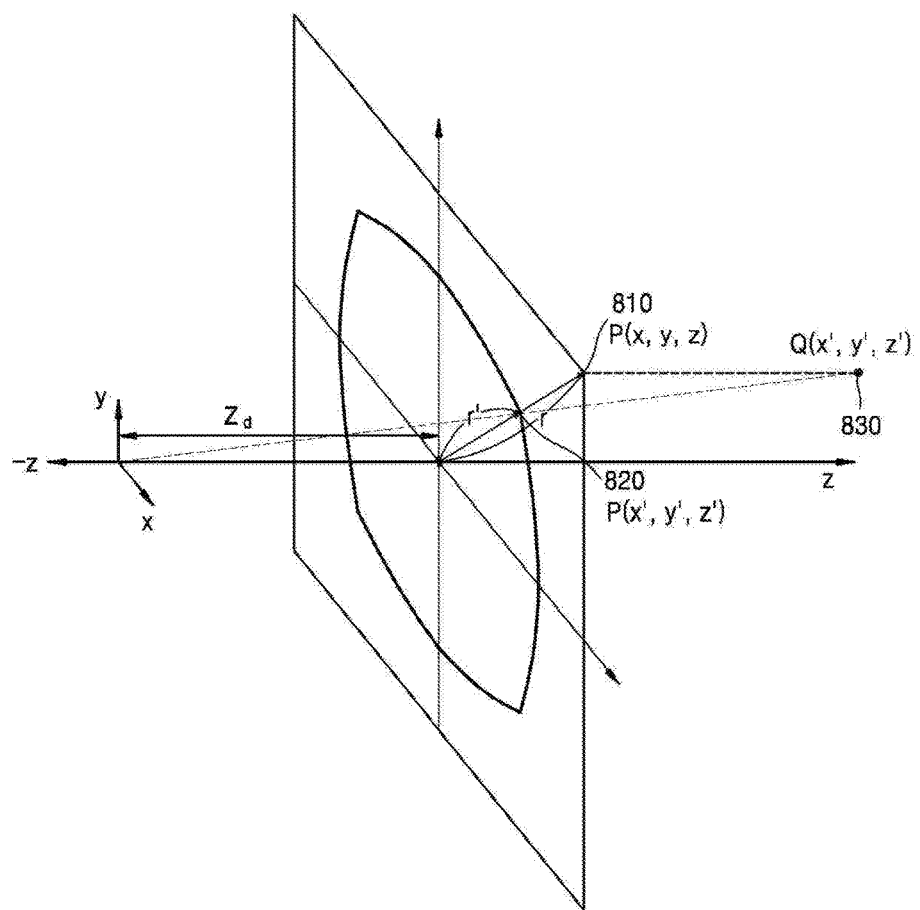
FIG. 8 is a diagram for describing a method, performed by a device, of rendering a distortion-corrected image by correcting depth values of pixels according to an embodiment of the present disclosure.

FIG. 8 is a diagram for describing a method, performed by a device, of rendering a distortion-corrected image by correcting depth values of pixels according to an embodiment of the present disclosure.

Referring to FIG. 8, a vertex P 810 may move to P' 820 due to distortion correction based on Equation 1.

The device according to an embodiment may correct the depth values of the pixels included in a source image, based on a perspective correction method of perspective projection. Herein, a perspective correction ratio based on perspective projection may have a reciprocal relationship with the distortion correction ratio described above in relation to FIG. 5. A description thereof will be provided below based on Equations 11 and 12.

The perspective projection method may be expressed as shown in Equation 12.

$$\begin{bmatrix} x^* \\ y^* \\ z^* \\ w \end{bmatrix} = \begin{bmatrix} \frac{2n}{r-l} & 0 & \frac{r+l}{r-l} & 0 \\ 0 & \frac{2n}{t-b} & \frac{t+b}{t-b} & 0 \\ 0 & 0 & -\frac{f+n}{f-n} & \frac{2fn}{f-n} \\ 0 & 0 & -\frac{1}{z_d} & 0 \end{bmatrix} \begin{bmatrix} x \\ y \\ z \\ 1 \end{bmatrix} \qquad \text{Equation 12}$$

In Equation 12, x, y, and z denote 3D coordinate values of a pixel before being corrected. As parameters of the perspective projection method, n denotes the minimum depth value, f denotes the maximum depth value, t denotes a top boundary coordinate, b denotes a bottom boundary coordinate, r denotes a right boundary coordinate, l denotes a left boundary coordinate, and $z_d$ denotes a distance between a point of view and a display on which the source image is displayed. The device according to an embodiment may correct a location of the pixel to a coordinate (x*/w, y*/w, z*/w, 1.0) based on a perspectively corrected coordinate system by dividing a result obtained using the perspective projection method, by a value w. Interpolation of the pixel in the perspectively corrected coordinate system may be expressed based on Equation 13.

$$x'_t = \frac{x^*_t}{w_t}, y'_t = \frac{y^*_t}{w_t} \quad \text{Equation 13}$$

$$r'_t = \frac{r_t}{w_t} \quad \text{Equation 14}$$

If Equation 5 for distortion correction is applied to Equation 14, it is shown that the perspective correction ratio and the distortion correction ratio have a reciprocal relationship as shown in Equation 15.

The device according to an embodiment may change depth values of a plurality of vertices based on a distortion correction ratio of each of the plurality of vertices by using the reciprocal relationship between the perspective correction ratio and the distortion correction ratio. The depth value of each of the plurality of vertices may be expressed based on Equation 15.

$$w_1 = \frac{1}{\lambda_1} = \frac{z}{z_d} \quad \text{Equation 15}$$

In Equation 15, $z_d$ denotes a distance between the point of view and the display on which the source image is displayed, z denotes a changed depth value of a first vertex, $w_1$ denotes a perspective correction ratio of the first vertex, and $\lambda_1$ denotes a distortion correction ratio of the first vertex.

The device according to an embodiment may obtain depth values of pixels located between the plurality of vertices, by performing interpolation on changed depth values of the plurality of vertices based on interpolation ratios. The depth values of the pixels located between the plurality of vertices may be obtained based on Equation 16.

$$z_t = z_1 + t(z_2 - z_1) \quad \text{Equation 16}$$

In Equation 16, $z_1$ and $z_2$ denote depth values of first and second vertices, respectively, and $z_t$ denotes a depth value of a pixel located between the plurality of vertices.

The device according to an embodiment may obtain Equation 17 showing a corrected distance between the pixel and a center of the source image, as a result of applying Equation 15 to Equation 5 based on the reciprocal relationship between the perspective correction ratio and the distortion correction ratio.

$$r'_t = \frac{r_t}{\lambda_t} = \frac{r_t}{\frac{1}{\lambda_1} + t\left(\frac{1}{\lambda_2} - \frac{1}{\lambda_1}\right)} = \frac{\lambda_1 \lambda_2 (r_2 - r_1) r_t}{(\lambda_1 - \lambda_2) r_t + \lambda_2 r_2 - \lambda_1 r_1} \quad \text{Equation 17}$$

In Equation 17, the definitions of parameters may be the same as those of Equation 5.

Referring to FIG. 8, it is shown that the vertex P 810 moves to P' 820 as a result of correcting the vertex P 810 based on the distortion correction ratio and that P' 820 is determined as a result of perspectively projecting a vertex Q 830. Herein, it is shown that P 810 and Q 830 merely have different depth values $z_d$ and z' but have the same coordinate value in two dimensions.

As such, the device according to an embodiment may render a pincushion-distortion-corrected image by performing perspective correction by changing only depth values in three dimensions without changing coordinates (x, y) in two dimensions.

According to an embodiment, a method of changing depth values of vertices may be replaced with a method of rendering a mesh-type object composed of vertices having depth values calculated as described above.

Figure 9:
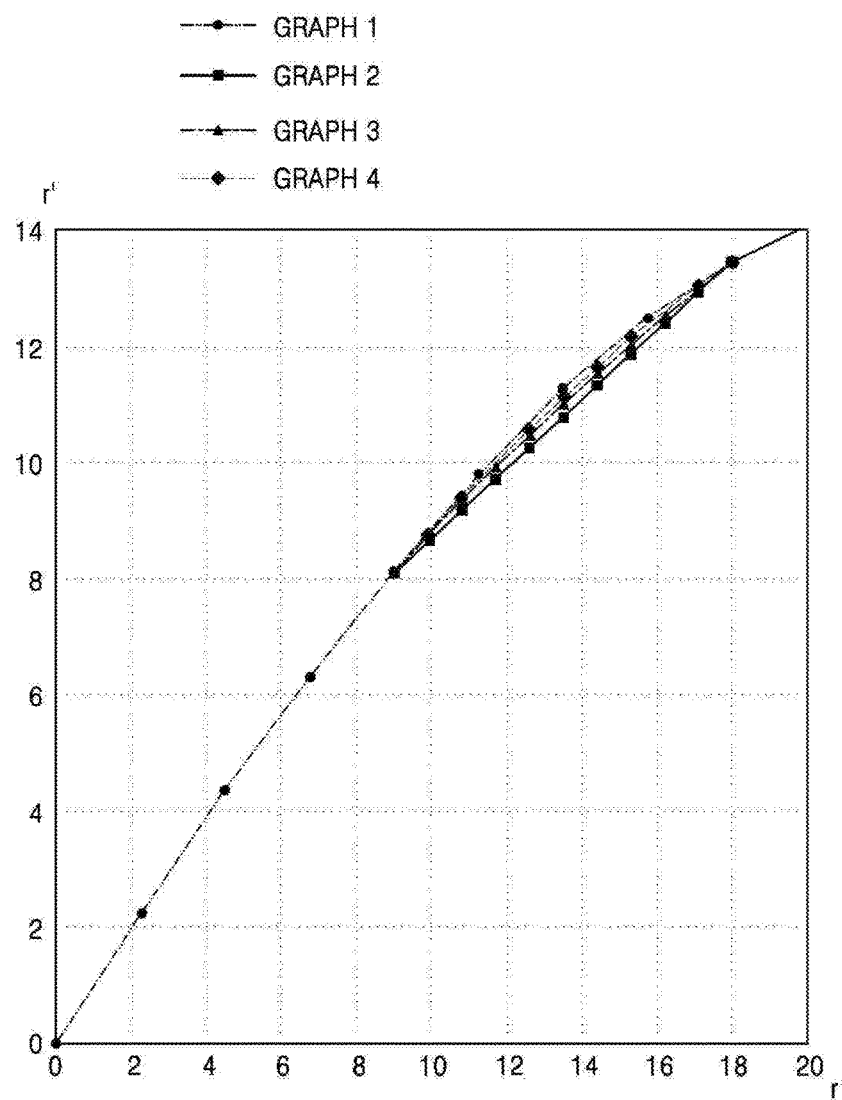
FIG. 9 is a graph for describing accuracy of pixels determined by a device according to an embodiment of the present disclosure.

FIG. 9 is a graph for describing accuracy of pixels determined by a device according to an embodiment of the present disclosure.

Referring to FIG. 9, accuracies of graph 1 showing a result of performing typical pixel-based distortion correction, graph 2 showing a result of performing distortion correction by determining distortion correction ratios of pixels according to an embodiment, graph 3 showing a result of performing distortion correction by changing depth values of pixels according to an embodiment, and graph 4 showing a result of performing typical linear-interpolation-based distortion correction.

Based on the graph of FIG. 9, it is shown that the graph 2 showing the result of performing distortion correction by determining the distortion correction ratios of the pixels according to an embodiment and the graph 3 showing the result of performing distortion correction by changing the depth values of the pixels according to an embodiment are closer to ideal correction values compared to the typical linear-interpolation-based distortion correction result. It is also shown that the result of performing distortion correction by determining the distortion correction ratios of the pixels according to an embodiment and the result of performing distortion correction by changing the depth values of the pixels according to an embodiment are very close to each other.

Figure 10:
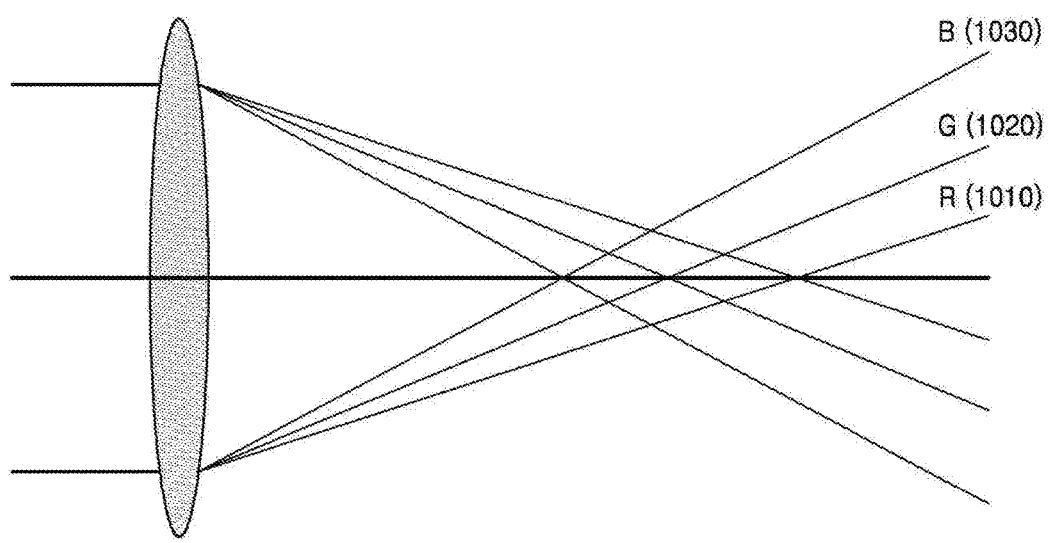
FIG. 10 is a diagram for describing a method, performed by a device, of rendering a distortion-corrected image by determining color-specific corrected location information of pixels according to an embodiment of the present disclosure.

FIG. 10 is a diagram for describing a method, performed by a device, of rendering a distortion-corrected image by determining color-specific corrected location information of pixels according to an embodiment of the present disclosure.

Referring to FIG. 10, it is shown that color values R (1010), G (1020), and B (1030) of a vertex or pixel are transmitted through a lens with different refractive indices due to different wavelengths thereof. To increase accuracy in distortion correction, the device according to an embodiment may perform the above-described distortion correction method per color of the pixel.

The device according to an embodiment may determine color-specific distortion correction ratios of a plurality of vertices. The device may determine color-specific corrected location information of pixels located between the plurality of vertices, based on the determined color-specific distortion correction ratios and interpolation ratios of the pixels. The color-specific corrected location information may include at least one of the color-specific distortion correction ratios and color-specific depth values.

For example, the device may determine color-specific distortion correction ratios of the pixels by performing interpolation on the color-specific distortion correction ratios of the plurality of vertices based on the interpolation ratios of the pixels. The device may render a distortion-corrected image by combining color-specific pixels determined based on the color-specific distortion correction ratios.

As another example, the device may determine color-specific depth values of the plurality of vertices based on the color-specific distortion correction ratios of the plurality of vertices and a distance between a point of view and a display on which a source image is displayed. The device may render a distortion-corrected image by combining color-specific pixels determined based on the color-specific depth values.

As the device according to an embodiment performs distortion correction per color, distortion correction operations are accumulated by the number of colors and thus accuracy in distortion correction may be increased.

Figure 11:
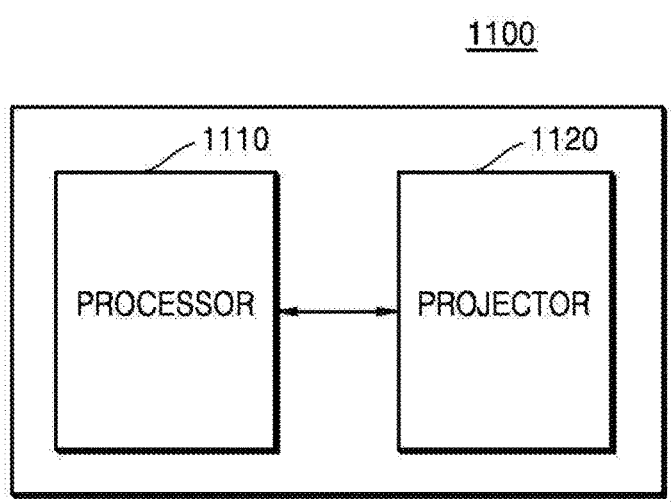
FIGS. 11 and 12 are block diagrams of a device for processing an image according to various embodiments of the present disclosure.
Figure 12:
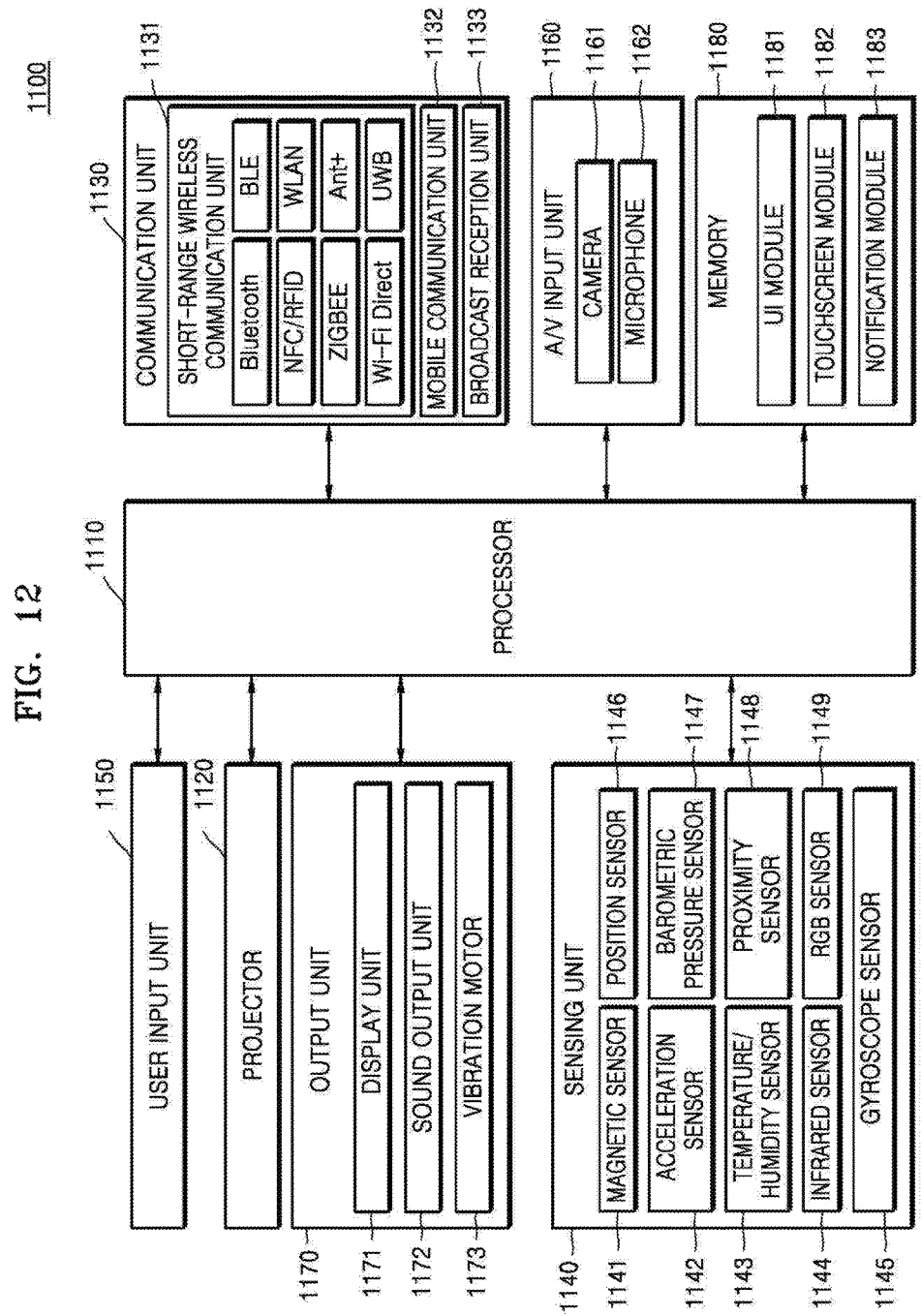

FIGS. 11 and 12 are block diagrams of a device 1100 for processing an image according to various embodiments of the present disclosure.

Referring to FIG. 11, the device 1100 according to an embodiment may include a processor 1110 (e.g., at least one processor) and a projector 1120. However, not all illustrated elements are essential. The device 1100 may include a smaller or larger number of elements.

For example, referring to FIG. 12, the device 1100 according to an embodiment of the present disclosure may further include a communication unit 1130 (e.g., a transceiver), a sensing unit 1140 (e.g., a sensor), a user input unit 1150 (e.g., a user interface), an audio/video (A/V) input unit 1160 (e.g., an A/V input device), an output unit 1170 (e.g., an A/V output device), and a memory 1180 (or storage) in addition to the processor 1110 (e.g., at least one processor) and the projector 1120. A device according to another embodiment may further include a lens (not shown) having a preset angle of view.

The above-mentioned elements will now be described one by one.

The processor 1110 normally controls overall operations of the device 1100. For example, the processor 1110 (e.g., at least one processor) may control the projector 1120, the communication unit 1130 (e.g., a transceiver), the sensing unit 1140, the user input unit 1150, the A/V input unit 1160, the output unit 1170, and the memory 1180 by executing programs stored in the memory 1180.

The processor 1110 determines a distortion correction ratio of each of a plurality of vertices included in a source image, based on information about a lens through which the source image is projected and which has a preset angle of view. In addition, the processor 1110 determines corrected location information of pixels located between the plurality of vertices, based on the distortion correction ratio of each of the plurality of vertices and interpolation ratios of the pixels. Furthermore, the processor 1110 renders a distortion-corrected image including pixels determined as a result of performing interpolation on the plurality of vertices based on the corrected location information.

The processor 1110 according to an embodiment may calculate distortion correction ratios of the pixels as a result of performing interpolation on the distortion correction ratio of each of the plurality of vertices based on the interpolation ratios. The processor 1110 may determine distances of the pixels from a center of the source image based on distances between the center of the source image and the plurality of vertices and the interpolation ratios of the pixels. In addition, the processor 1110 may determine changed distances of the pixels based on the distances of the pixels from the center of the source image and the distortion correction ratios of the pixels.

The processor 1110 according to an embodiment may determine depth values of the plurality of vertices based on the distortion correction ratios of the plurality of vertices and a distance between a point of view and a display on which the source image is displayed. In addition, the processor 1110 may calculate depth values of the pixels by performing interpolation on the depth values of the plurality of vertices based on the interpolation ratios of the pixels.

The processor 1110 according to an embodiment may render a distortion-corrected image including a plurality of vertices and pixels corrected based on the determined depth values.

The processor 1110 according to an embodiment may determine color-specific distortion correction ratios of the plurality of vertices. In addition, the processor 1110 may determine color-specific distortion correction ratios of the pixels by performing interpolation on the color-specific distortion correction ratios of the plurality of vertices based on the interpolation ratios. The processor 1110 may generate color-specific distortion-corrected images including pixels generated as a result of performing interpolation on the plurality of vertices based on the color-specific distortion correction ratios of the pixels, and render a distortion-corrected image by combining the color-specific distortion-corrected images.

The processor 1110 according to an embodiment may determine color-specific depth values of the plurality of vertices based on the color-specific distortion correction ratios of the plurality of vertices and the distance between the point of view and the display on which the source image is displayed. In addition, the processor 1110 may determine color-specific depth values of the pixels by performing interpolation on the color-specific depth values of the plurality of vertices based on the interpolation ratios.

The projector 1120 may output the distortion-corrected image rendered by the processor 1110.

The communication unit 1130 may include one or more elements for enabling communication between the device 100 and an external device. For example, the communication unit 1130 may include a short-range wireless communication unit 1131, a mobile communication unit 1132, and a broadcast reception unit 1133.

The short-range wireless communication unit 1131 may include a Bluetooth communication unit, a Bluetooth low energy (BLE) communication unit, a near field communication unit, a wireless local area network (WLAN) (e.g., Wi-Fi) communication unit, a ZigBee communication unit, an infrared data association (IrDA) communication unit, a Wi-Fi direct (WFD) communication unit, an ultra-wideband (UWB) communication unit, and an Ant+ communication unit, but is not limited thereto.

The mobile communication unit 1132 transmits and receives radio signals to and from at least one of a base station, an external device, and a server in a mobile communication network. Herein, the radio signals may include various types of data based on transmission and reception of voice call signals, video call signals, and text/multimedia messages.

The broadcast reception unit 1133 receives broadcast signals and/or broadcast-related information through a broadcast channel from an external device. The broadcast channel may include a satellite channel and a terrestrial channel. According to another embodiment, the device 1100 may not include the broadcast reception unit 1133.

The sensing unit 1140 may detect at least one of a status of the device 1100, a status around the device 1100, and/or a status of a user who is wearing the device 100, and transmit the detected information to the processor 1110.

The sensing unit 1140 may include at least one of a magnetic sensor 1141, an acceleration sensor 1142, a temperature/humidity sensor 1143, an infrared sensor 1144, a gyroscope sensor 1145, a position sensor (e.g., a global positioning system (GPS)) 1146, a barometric pressure sensor 1147, a proximity sensor 1148, and an red, green, and blue (RGB) sensor (or an illuminance sensor) 1149, but is not limited thereto. Functions of the sensors may be intuitively inferred from their names by one of ordinary skill in the art, and thus detailed descriptions thereof are not provided herein.

The user input unit 1150 refers to an element used when the user inputs data to control the device 1100. For example, the user input unit 1150 may include a keypad, a dome switch, a touchpad (e.g., a capacitive overlay type, a resistive overlay type, an infrared beam type, a surface acoustic wave type, an integral strain gauge type, a piezoelectric type), a jog wheel, or a jog switch, but is not limited thereto.

The user input unit 1150 may receive user input. For example, the user input unit 1150 may be associated with a user interface (UI) module 1181 to receive a user input of selecting at least one of items displayed on detection regions of the sensors. However, the type of the user input received by the user input unit 1150 is not limited to the above-described example.

The A/V input unit 1160 is used to input audio signals or video signals, and may include a camera 1161 and a microphone 1162. The camera 1161 may obtain image frames such as still images or video images by using an image sensor in a video call mode or an image capturing mode. The images captured by the image sensor may be processed by the processor 1110 or an image processor (not shown).

The image frames processed by the camera 1161 may be stored in the memory 1180 or transmitted to an external device via the communication unit 1130. Two or more cameras 1161 may be provided depending on the configuration of the device 1100.

The microphone 1162 receives an external sound signal and processes the same into electrical voice data. For example, the microphone 1162 may receive the sound signal from an external device or the user. The microphone 1162 may use various noise reduction algorithms to reduce noise caused when the external sound signal is received.

The output unit 1170 is used to output audio signals, video signals, or vibration signals, and may include a display unit 1171, a sound output unit 1172, and a vibration motor 1173.

When the display unit 1171 and a touchpad are layered to configure a touchscreen, the display unit 1171 may be used as an input device as well as an output device. The display unit 1171 may include at least one of a liquid crystal display (LCD), a thin film transistor-liquid crystal display (TFT-LCD), an organic light-emitting diode (OLED), a flexible display, a three-dimensional (3D) display, and an electrophoretic display. The device 1100 may include two or more display units 1171 depending on the configuration of the device 1100. In this case, the two or more display units 1171 may be provided to face each other by using hinges.

The sound output unit 1172 outputs audio data received from the communication unit 1130 or stored in the memory 1180. In addition, the sound output unit 1172 outputs sound signals related to functions performed by the device 1100 (e.g., call signal reception sound, message reception sound, and notification sound). The sound output unit 1172 may include a speaker or a buzzer.

The vibration motor 1173 may output vibration signals. For example, the vibration motor 1173 may output vibration signals corresponding to output of video data or audio data. In addition, the vibration motor 1173 may output vibration signals when touches are input to the touchscreen.

The memory 1180 may store programs for process and control operations of the processor 1110, and store input/output data.

The memory 1180 may include at least one type of storage medium among flash memory, a hard disk, a multimedia card micro, card type memory (e.g., secure digital (SD) or extreme digital (XD) memory), random access memory (RAM), static random access memory (SRAM), read-only memory (ROM), electrically erasable programmable ROM (EEPROM), programmable ROM (PROM), magnetic memory, a magnetic disc, and an optical disc. Alternatively or additionally, the device 1100 may use a web storage or a cloud server serving as the memory 1180 in the Internet.

The programs stored in the memory 1180 may be divided into a plurality of modules, e.g., a user interface (UI) module 1181, a touchscreen module 1182, and a notification module 1183, depending on functions thereof.

The UI module 1181 may provide a specialized UI or a graphic user interface (GUI) associated with the device 1100 per application. The touchscreen module 1182 may detect a touch gesture of the user on the touchscreen, and transmit information about the touch gesture to the processor 1110. The touchscreen module 1182 according to an embodiment of the present disclosure may recognize and analyze touch code. The touchscreen module 1182 may be configured as independent hardware including a controller (e.g., at least one processor).

Various sensors may be provided in or near the touchscreen to detect touches or proximity touches on the touchscreen. An example of the sensors for detecting touches on the touchscreen is a tactile sensor. The tactile sensor refers to a sensor capable of detecting human-sensible or greater strengths of touches of a certain object. The tactile sensor may detect various types of information, e.g., roughness of a contact surface, hardness of a contact object, and temperature of a contact point.

Another example of the sensors for detecting touches on the touchscreen is a proximity sensor.

The proximity sensor refers to a sensor capable of detecting the presence of an object approaching or in proximity of a certain detection surface by using force of an electromagnetic field or infrared light without a mechanical contact. Examples of the proximity sensor include a transmissive photoelectric sensor, a direct-reflective photoelectric sensor, a mirror-reflective photoelectric sensor, an inductive proximity sensor, a capacitive proximity sensor, a magnetic proximity sensor, and an infrared proximity sensor. The touch gesture of the user may include tap, touch and hold, double tap, drag, pan, flick, drag and drop, swipe, etc.

The notification module 1183 may generate a signal for notifying that an event of the device 1100 has occurred. The event of the device 1100 include, for example, key signal input. The notification module 1183 may output the notification signal in the form of a video signal via the display unit 1171, in the form of an audio signal via the sound output unit 1172, or in the form of a vibration signal via the vibration motor 1173.

The method according to an embodiment of the present disclosure can be implemented in the form of program instructions that can be executed through various computer components and recorded on a non-transitory computer-readable recording medium. The non-transitory computer-readable recording medium may include program instructions, data files, data structures, or a combination thereof. The program instructions recorded on the non-transitory computer-readable recording medium may be program instructions specially designed and configured for the present disclosure or program instructions known to and usable by one of ordinary skill in the art of computer software. Examples of the non-transitory computer-readable recording medium include magnetic media (e.g., a hard disk, a floppy disk, and a magnetic tape), optical recording media (e.g., a compact disc-ROM (CD-ROM) and a digital versatile disc (DVD)), magneto-optical media (e.g., a floptical disk), and hardware devices specially configured to store and execute program instructions (e.g., a ROM, a RAM, and a flash memory). Examples of the program instructions include machine code generated by a compiler and high-level programming code that can be executed by a computer using an interpreter or the like.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of processing an image in a device, the method comprising:
   determining a distortion correction ratio of each of a plurality of vertices comprised in a source image, based on information about a lens through which the source image is projected;
   determining corrected location information including depth values of the plurality of vertices, based on the distortion correction ratio of each of the plurality of vertices and a distance between a point of view and a display on which the source image is projected; and
   rendering a distortion-corrected image comprising pixels determined based on the determined depth values.

2. The method of claim 1, wherein the corrected location information comprises distortion correction ratios of the pixels, which are calculated as a result of performing interpolation on the distortion correction ratio of each of the plurality of vertices based on interpolation ratios of the pixels.

3. The method of claim 1, further comprising:
   determining distances of the pixels from a center of the source image based on distances between the center of the source image and the plurality of vertices and the interpolation ratios of the pixels,
   wherein the rendering of the distortion-corrected image comprises determining changed distances of the pixels based on the distances of the pixels from the center of the source image and distortion correction ratios of the pixels.

4. The method of claim 1, further comprising:
   determining depth values of the plurality of vertices based on the distortion correction ratio of each of the plurality of vertices and a distance between a point of view and a display on which the source image is projected,
   wherein the depth values of the pixels are calculated as a result of performing interpolation on the depth values of the plurality of vertices based on interpolation ratios of the pixels.

5. The method of claim 4, wherein the rendering of the distortion-corrected image comprises rendering a distortion-corrected image comprising a plurality of vertices and pixels corrected based on the determined depth values.

6. The method of claim 1,
   wherein the determining of the distortion correction ratio of each of the plurality of vertices comprises determining color-specific distortion correction ratios of the plurality of vertices, and
   wherein the corrected location information of the pixels comprises color-specific distortion correction ratios of the pixels, which are calculated as a result of performing interpolation on the color-specific distortion correction ratios of the plurality of vertices based on the interpolation ratios.

7. The method of claim 6, wherein the rendering of the distortion-corrected image comprises:
   generating color-specific distortion-corrected images comprising pixels generated as a result of performing interpolation on the plurality of vertices based on the color-specific distortion correction ratios of the pixels, and
   rendering a distortion-corrected image by combining the color-specific distortion-corrected images.

8. The method of claim 6, further comprising:
   determining color-specific depth values of the plurality of vertices based on the color-specific distortion correction ratios of the plurality of vertices and a distance between a point of view and a display on which the source image is projected,
   wherein the corrected location information of the pixels comprises color-specific depth values of the pixels, which are calculated as a result of performing interpolation on the color-specific depth values of the plurality of vertices based on the interpolation ratios.

9. The method of claim 1, further comprising:
   outputting the distortion-corrected image,
   wherein the distortion-corrected image is viewed through the lens by a user of the device.

10. A non-transitory computer-readable recording medium having recorded thereon a program for executing the method of claim 1 on a computer.

11. A device for processing an image, the device comprising:
    at least one processor configured to:
       determine a distortion correction ratio of each of a plurality of vertices comprised in a source image, based on information about a lens through which the source image is projected,
       determine corrected location information including depth values of the plurality of vertices, based on the distortion correction ratio of each of the plurality of vertices and a distance between a point of view and a display on which the source image is projected, and
       render a distortion-corrected image comprising pixels determined based on the determined depth values; and
    a projector configured to output the distortion-corrected image.

12. The device of claim 11, wherein the corrected location information comprises distortion correction ratios of the pixels, which are calculated as a result of performing interpolation on the distortion correction ratio of each of the plurality of vertices based on interpolation ratios of the pixels.

13. The device of claim 11, wherein the at least one processor is further configured to:
   determine distances of the pixels from a center of the source image based on distances between the center of the source image and the plurality of vertices and the interpolation ratios of the pixels, and
   determine changed distances of the pixels based on the distances of the pixels from the center of the source image and distortion correction ratios of the pixels.

14. The device of claim 11,
   wherein the at least one processor is further configured to determine depth values of the plurality of vertices based on the distortion correction ratio of each of the plurality of vertices and a distance between a point of view and a display on which the source image is projected, and
   wherein the depth values of the pixels are calculated as a result of performing interpolation on the depth values of the plurality of vertices based on interpolation ratios of the pixels.

15. The device of claim 14, wherein the at least one processor is further configured to render a distortion-corrected image comprising a plurality of vertices and pixels corrected based on the determined depth values.

16. The device of claim 11,
   wherein the at least one processor is further configured to determine color-specific distortion correction ratios of the plurality of vertices, and
   wherein the corrected location information of the pixels comprises color-specific distortion correction ratios of the pixels, which are calculated as a result of performing interpolation on the color-specific distortion correction ratios of the plurality of vertices based on the interpolation ratios.

17. The device of claim 16, wherein the at least one processor is further configured to:
   generate color-specific distortion-corrected images comprising pixels generated as a result of performing interpolation on the plurality of vertices based on the color-specific distortion correction ratios of the pixels, and
   render a distortion-corrected image by combining the color-specific distortion-corrected images.

18. The device of claim 16,
   wherein the at least one processor is further configured to determine color-specific depth values of the plurality of vertices based on the color-specific distortion correction ratios of the plurality of vertices and a distance between a point of view and a display on which the source image is projected, and
   wherein the corrected location information of the pixels comprises color-specific depth values of the pixels, which are calculated as a result of performing interpolation on the color-specific depth values of the plurality of vertices based on the interpolation ratios.

19. The device of claim 11,
   wherein the lens includes a preset angle of view, and
   wherein the distortion-corrected image is viewed through the lens by a user of the device.

* * * * *